United States Patent [19]

Markus

[11] Patent Number: 4,738,376
[45] Date of Patent: Apr. 19, 1988

[54] PLASTIC COVERING CAP

[76] Inventor: Richard N. Markus, 11934 S. Maple, Blue Island, Ill. 60406

[21] Appl. No.: 820,971

[22] Filed: Jan. 22, 1986

[51] Int. Cl.⁴ .............................................. B65D 39/00
[52] U.S. Cl. .................................... 220/352; 220/307; 220/254; 220/DIG. 33
[58] Field of Search ....... 220/352, 254, 307, DIG. 33; 215/306, 307, 320, 339, 343, 344, 345, 346, 354

[56] References Cited

U.S. PATENT DOCUMENTS

| | | | |
|---|---|---|---|
| 2,133,520 | 10/1938 | Ritz-Woller | 220/86 |
| 2,144,584 | 1/1939 | Gleason | 220/86 |
| 2,247,509 | 7/1941 | Lebus | 220/86 |
| 2,597,014 | 5/1952 | Mariani | 220/86 |
| 2,657,824 | 11/1953 | Mariani | 220/35 |
| 3,021,976 | 2/1962 | Tracy | 220/307 X |
| 3,580,414 | 5/1971 | Ginsburgh et al. | 220/86 |
| 3,750,825 | 8/1973 | Bachle | 220/35 |
| 3,998,354 | 12/1976 | Song | 220/254 X |
| 4,091,959 | 5/1978 | O'Banion | 220/304 |
| 4,220,249 | 9/1980 | Nilsson | 215/306 X |
| 4,380,304 | 4/1983 | Anderson | 220/307 X |
| 4,391,385 | 7/1983 | Rausing | 220/307 |
| 4,467,937 | 8/1984 | Shaw | 220/246 |
| 4,538,731 | 9/1985 | Cillario | 220/254 X |
| 4,646,932 | 3/1987 | Masler | 220/307 |

*Primary Examiner*—Steven M. Pollard

[57] ABSTRACT

A plastic cap for insertion into the filler spout of a fuel tank including a base member with a downwardly extending sleeve and one or more annular outwardly extending ridges adapted to pass through and subsequently engage the interior neck of the filler spout securing the cap in place. The cap further includes a cover member integrally attached to the base member and adapted to seal the filler spout when placed in the closed position. When the cover member is in the open position, access to the filler spout is provided.

6 Claims, 1 Drawing Sheet

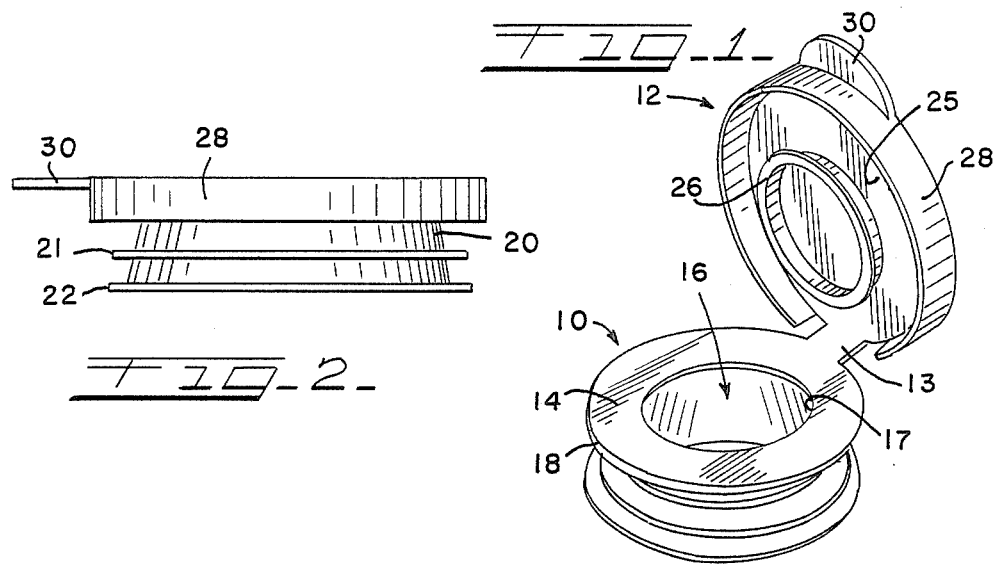
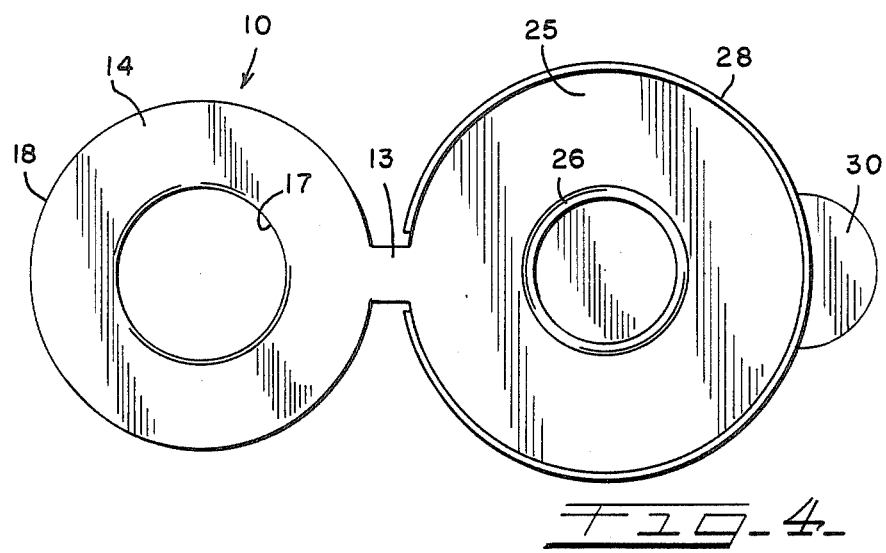
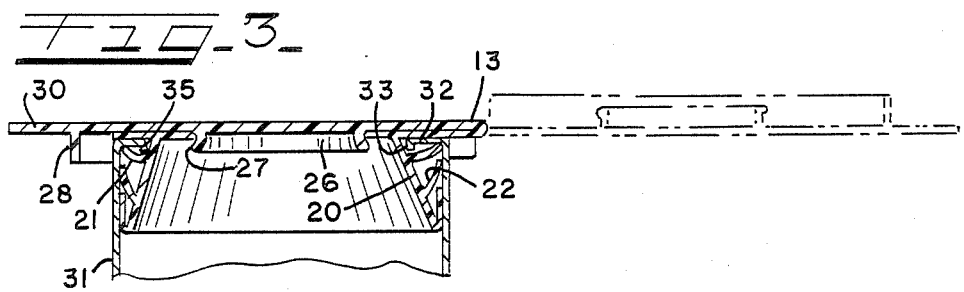

PLASTIC COVERING CAP

BACKGROUND OF THE INVENTION

The present invention relates to a plastic cap having a sleeve which is inserted and secured in the filler spout of a fuel tank. Traditionally, filler spouts found on cars and trucks provide a cap with screw threads. The cap can be screwed on and off when fueling of the vehicle is required. Since the cap lies loose while fueling takes place, the opportunity arises for the cap to be misplaced, lost, or dropped to roll to a resting place from which it may be difficult to retrieve. Often, if fuel enters the spout too rapidly, it will splash or foam back on the hands, feet, or clothing of the person fueling the vehicle.

Various approaches have been taken in the prior art to solve the problems presented. Attempts at solutions are shown in the following patents which relate primarily to fuel tank covers: U.S. Pat. Nos. 1,902,456, 3,478,922, 3,903,942, 4,135,404, and 4,441,533. Other cover arrangements in the closure art generally are shown in U.S. Pat. Nos. 3,419,198, 3,465,925, and 4,106,656.

SUMMARY OF THE INVENTION

The plastic gas cap of the present invention is designed to replace the screw-on cap normally found on cars and trucks. It is arranged with a base member having a plastic sleeve which is inserted into the filler spout of the fuel tank. The sleeve is provided with radially outwardly extending rings which are resiliently flexible and are forced past and then engage the interior neck of the filler spout to secure the cap in place. A cover member is hingedly attached to the base and is adapted to overlie and seal an aperture formed in the base member when the cover assumes its closed position. When flipped to the open position, the cap pivots upright and access is provided to insert the nozzle of a fuel conduit through the aperture defined in the base member to supply fuel to the tank. When fueling is finished, the cap is snapped back to its closed position.

BRIEF DESCRIPTION OF THE DRAWINGS

FIG. 1 is a perspective view showing the plastic covering cap of the present invention in its open position.

FIG. 2 is a side view showing the cap in its closed and sealing position.

FIG. 3 is a side view, in section, of the cap in its closed position shown in solid lines and in its open position shown, in phantom, in dotted lines.

FIG. 4 is a top view showing the cap in an open position.

DESCRIPTION OF THE PREFERRED EMBODIMENT

As shown in FIG. 1, the plastic covering cap of the present invention consists of a base member 10 and a cover member 12 which are connected together by a flexible plastic strip 13 formed as an integral part of the base and cover. The entire assembly is formed of plastic. It has been determined that a copolymer of polypropylene provides acceptable results having a thickness of the general cross-section of approximately 0.050 inches.

The base member 10 consists of a flat flange 14 of annular configuration which defines an aperture 16 in the center thereof. The flange includes an inner edge 17 and an outer edge 18. As best seen in FIG. 3, the base member 10 also includes a downwardly extending, flexible sleeve member 20 which is connected to the flange 14 at a point intermediate the inner edge 17 and the outer edge 18. The sleeve 20 extends around the periphery of the base member and is frustoconical in cross-section having a larger diameter at its lower end and a smaller diameter at its upper end.

The sleeve 20 includes a plurality of radially outwardly extending ridges or rings 21, 22 which are shown in FIG. 2 in an unflexed position. The rings are thin and flexible and extend approximately ¼ inch from the base of the sleeve 20. Because of the frustoconical configuration of the sleeve 20, the outer edge of the ring 22 will extend beyond the outer edge of the ring 21 as best seen in FIG. 1. Although two rings 21, 22 are illustrated in the drawings, a plastic covering cap within the scope of the present invention may include a single ring or a number of rings, greater than two, depending upon the dimensions of the filler spouts in which the cap is to be inserted.

The cover member 12 includes a flat face section 25 on the bottom thereof which is adapted to overlie the flange 14 of the base member. The cover also includes a downwardly extending plug member 26 with an outwardly curved lip 27 of slightly greater diameter than the aperture 16 defined by the flange 14. The plug 26 is designed to be inserted through aperture 16 in a force-fit engagement to effect a seal thereof. The cover member 12 also includes a downwardly extending lip 28 which extends substantially around the entire cover member and is positioned at a point lying on the outer perimeter of the cover. Extending from the cover 12 is a tab 30 designed for easy engagement by a finger for opening or closing the cap.

The operation of the plastic covering cap of the present invention is as follows. The cap is designed to be universally adaptable for use in association with filler spouts of fuel tanks on any of a wide variety of vehicles. It is designed to replace the standard screw-on cap for the filler spout which is conventionally furnished with the vehicle. When properly used, the cap of the present invention will eliminate lost filler caps and will prevent or substantially reduce the undesirable overflow normally accompanying vehicle refueling. The size of the openings in filler spouts varies from vehicle to vehicle often depending upon the type of fuel which the vehicle was designed to utilize. One aperture dimension is standard for vehicles using regular fuel, another standard on vehicles designed to operate on unleaded fuel only, and a third dimension for vehicles which utilize diesel fuel. The cap of the present invention, because of its unique design, is adaptable to operate with any of the above described filler spouts.

First the screw cap normally provided with the vehicle is removed from the filler spout and set aside. Typically, the filler spout includes a tubular conduit 31, as shown in FIG. 3, with an inwardly turned flange 32 and a downwardly directed lip 33. The sleeve 20 is inserted through the aperture 35 defined at the entrance to the filler spout. In most instances, the lower section of the sleeve will be of larger diameter than the aperture requiring that the sleeve be squeezed inwardly until its lower, outer diameter is able to pass through the opening of the filler spout. As the sleeve is urged downwardly through the aperture 35, the rings 22, 21 successively engage the inwardly directed flange 32 since the rings are of larger dimension than the aperture. Because the rings are flexible, further downward force exerted against the cap will cause the rings to flex upwardly until they pass through the aperture 35. This downward force is exerted until the lower edge of the flange 14 makes contact with the upper surface of the annular face formed by inwardly extending leg 32. At this point, the rings will, to some extent, have resumed their radially outwardly directed orientation and will engage underneath the inwardly extending leg 32, as shown in FIG. 3. The cap is now secured on a relatively permanent basis within the filler spout and acts as an integral unit which will remain with the vehicle throughout its intended life.

To perform a fueling operation, the cover member 12 is opened by lifting the tab 30 to remove the plug 26 from its sealing engagement in the aperture 16. The plastic strip 13 functions as a hinge allowing the cover member 12 to pivot assuming a 90° position, as shown in FIG. 1, or a 180° position, as shown in FIG. 4, or anywhere between. Once opened, the cap will assume whatever position the operator desires and will generally remain in the position in which it is placed.

The fueling operation now takes place by inserting the nozzle of the fuel hose through the aperture 16 formed in the flange 14. As will be noted, the aperture 16 is of substantially smaller diameter than the diameter of the filler spout. This will greatly reduce or eliminate any fuel spillover during the fueling operation. In prior art arrangements, it is often the case that when fuel enters the filler spout at too rapid a rate, the fuel will back up and spill over as the tank approaches its full condition. Because of the unique arrangement of the present invention, this spillover is minimized, if not eliminated. The frusto-conical arrangement of the sleeve and the smaller aperture 16 provided in the sleeve act to curtail the splash and spillover of fuel preventing the unhappy situation wherein fuel is splashed on the clothes and/or shoes of the operator.

Once fueling of the vehicle to a desired level has been completed, the cap is again pivoted through use of the tab 30 until the plug 26 encounters the aperture 16. A slight additional downward pressure on the tab 30 forces the plug 26 and the outwardly extending lip 27 through the aperture 16 in a force-fit locking and sealing engagement. This prevents entry of any contaminants into the fuel filler spout and tank and also prevents the inadvertent passage of fuel out of the spout when the vehicle is accelerated or placed on an incline. The plastic hinge 13 is an integral part of both the base member and the cover member, extending therebetween, and secures these elements permanently together thereby preventing accidental loss or displacement of the cap. The downwardly extending lip 28 serves as further protection against the entry of contaminants into the vehicle fuel tank.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A plastic covering cap adapted for mounting in fuel tank inlets of varying internal dimension including a base member comprising a flange defining an aperture in the central portion thereof, a flexible sleeve member of a given thickness extending downwardly from said flange, said sleeve adapted to be inserted into the interior of a filler spout, said sleeve including one or more radially outwardly extending flexible annular rings, each having a radial dimension substantially greater than said thickness of said sleeve member at least one of said rings being resiliently deformable to engage said filler spout to secure said cap in place while at least one of said rings being flexibly engageable with a side wall of said filler spout to seal against the flow of liquid therebetween, a cover member integrally hingedly attached to said base member comprising a lid adapted to overlie said base member when in a closed position, a plug extending downwardly from said lid and adapted for insertion into said aperture defined in said flange of said base member to seal said aperture, and a flexible plastic strip integrally formed with and extending between said base and said cover to hingedly secured said base and said cover together.

2. A plastic covering cap as in claim 1 in which said sleeve defines a frustoconical cross-section of greater diameter at the bottom than the top.

3. A plastic covering cap as in claim 1 in which said sleeve includes a plurality of annular rings extending radially outwardly from the perimeter of said sleeve member.

4. A plastic covering cap as in claim 1 in which the diameter of said aperture in said flange is substantially less than the internal diameter of said filler spout.

5. A plastic covering cap as in claim 1 in which said cover member includes a tab extending from said lid for opening or closing said cover.

6. A plastic covering cap as in claim 1 in which said cover member includes a downwardly extending lip formed around substantially the entire perimeter thereof, said lip adapted to overlie a portion of the end of said filler spout when said cover member is in the closed position.

* * * * *